US011512652B2

(12) United States Patent
Light-Holets

(10) Patent No.: US 11,512,652 B2
(45) Date of Patent: Nov. 29, 2022

(54) SYSTEMS AND METHODS FOR PREVENTING DEACTIVATION OF A CYLINDER OF AN INTERNAL COMBUSTION ENGINE SYSTEM

(71) Applicant: CUMMINS INC., Columbus, IN (US)

(72) Inventor: Jennifer Kay Light-Holets, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/272,526

(22) PCT Filed: Sep. 5, 2019

(86) PCT No.: PCT/US2019/049702
§ 371 (c)(1),
(2) Date: Mar. 1, 2021

(87) PCT Pub. No.: WO2020/076440
PCT Pub. Date: Apr. 16, 2020

(65) Prior Publication Data
US 2021/0324811 A1 Oct. 21, 2021

Related U.S. Application Data

(60) Provisional application No. 62/742,507, filed on Oct. 8, 2018.

(51) Int. Cl.
*F02D 41/00* (2006.01)
*F02D 13/04* (2006.01)
(Continued)

(52) U.S. Cl.
CPC ............. *F02D 13/04* (2013.01); *F02D 17/02* (2013.01); *F02D 41/0087* (2013.01);
(Continued)

(58) Field of Classification Search
CPC ...... F02D 41/0087; F02D 41/12; F02D 41/22; F02D 13/04; F02D 17/02;
(Continued)

(56) References Cited

U.S. PATENT DOCUMENTS 4,824,186 A * 4/1989 Leiber .................. B60T 13/143
180/197
7,083,020 B2 * 8/2006 Morimoto ........... F02N 11/0822
180/65.26
(Continued)

OTHER PUBLICATIONS

Delphi Technologies, "48-Volt, Mild Hybrid with Dynamic Skip Fire," 5 pages (2018).
(Continued)

*Primary Examiner* — Sizo B Vilakazi
*Assistant Examiner* — Brian R Kirby
(74) *Attorney, Agent, or Firm* — Foley & Lardner LLP

(57) ABSTRACT

An internal combustion engine system includes an internal combustion engine, a controller, and an increased brake load event communicator. The internal combustion engine includes a first cylinder and a first cylinder deactivation prevention mechanism. The first cylinder is configured to be selectively activated and deactivated. The first cylinder deactivation prevention mechanism is configured to selectively prevent the first cylinder from being deactivated. The controller is communicable with the first cylinder deactivation prevention mechanism. The controller includes an increased brake load event detection module that is configured to selectively control the first cylinder deactivation prevention mechanism to prevent the first cylinder from being deactivated. The increased brake load event communicator is communicable with the controller. The increased brake load event detection module is configured to control the first cylinder deactivation prevention mechanism to
(Continued)

prevent the first cylinder from being deactivated based on a communication from the increased brake load event communicator.

20 Claims, 2 Drawing Sheets

(51) Int. Cl.
  *F02D 17/02* (2006.01)
  *F02D 41/12* (2006.01)
  *F02D 41/22* (2006.01)
  *B60W 30/18* (2012.01)
(52) U.S. Cl.
  CPC ............. *F02D 41/12* (2013.01); *F02D 41/22* (2013.01); *B60W 30/18136* (2013.01); *F02D 2200/501* (2013.01); *F02D 2200/701* (2013.01); *F02D 2200/702* (2013.01)
(58) Field of Classification Search
  CPC ......... F02D 2200/701; F02D 2200/501; F02D 2200/702; B60W 30/18136
  USPC .......................................... 123/481, 320–321
  See application file for complete search history.

(56) References Cited

U.S. PATENT DOCUMENTS

| | | | |
|---|---|---|---|
| 7,201,140 | B2 | 4/2007 | Megli et al. |
| 8,606,483 | B2 | 12/2013 | Krupadanam et al. |
| 8,634,939 | B2* | 1/2014 | Martin ............ B60W 30/18136 701/72 |
| 9,328,672 | B2 | 5/2016 | Serrano et al. |
| 9,777,656 | B1* | 10/2017 | Bowman ............. F02D 41/0087 |
| 2002/0116112 | A1* | 8/2002 | Wakashiro ............. B60K 6/485 903/905 |
| 2003/0236599 | A1* | 12/2003 | Saito ................... F02D 41/0087 903/917 |
| 2004/0113485 | A1* | 6/2004 | Oliver ..................... B60T 17/18 303/3 |
| 2004/0147364 | A1* | 7/2004 | Wakashiro ................ F01L 1/08 477/109 |
| 2005/0218716 | A1* | 10/2005 | Collins ................... B60T 13/72 303/115.3 |
| 2008/0295485 | A1* | 12/2008 | Wiley ................. F02D 41/0235 123/321 |
| 2009/0276128 | A1* | 11/2009 | Whitney ............. F02D 41/0087 701/54 |
| 2010/0071656 | A1* | 3/2010 | Freese, V ........... F02D 41/0245 60/287 |
| 2010/0100299 | A1* | 4/2010 | Tripathi .............. F02D 41/0087 701/102 |
| 2010/0114437 | A1* | 5/2010 | Boss ...................... B60K 28/08 701/48 |
| 2010/0154526 | A1* | 6/2010 | Cinpinski ............. F01L 1/3442 701/101 |
| 2011/0040471 | A1* | 2/2011 | Krupadanam ...... F02D 41/0087 701/101 |
| 2012/0215412 | A1* | 8/2012 | Seymour ................... B60T 7/22 701/1 |
| 2013/0297164 | A1* | 11/2013 | Lauffer ................. B60W 10/18 701/70 |
| 2014/0136041 | A1* | 5/2014 | Malone ................. B60W 10/06 701/123 |
| 2014/0180553 | A1* | 6/2014 | Eckert ..................... B60T 8/885 701/70 |
| 2015/0191168 | A1* | 7/2015 | Mitsuyasu ............. F02D 13/06 701/54 |
| 2016/0090920 | A1* | 3/2016 | Minaz ................... F02D 41/021 123/320 |
| 2016/0214595 | A1* | 7/2016 | Baehrle-Miller ......... B60T 7/22 |
| 2017/0355374 | A1 | 12/2017 | Glugla |
| 2017/0356375 | A1 | 12/2017 | Glugla |
| 2018/0029577 | A1* | 2/2018 | Beauvais ................ B60T 8/176 |
| 2018/0057001 | A1 | 3/2018 | Hu et al. |
| 2018/0126978 | A1* | 5/2018 | Jerger ................... B60W 10/08 |
| 2018/0141538 | A1* | 5/2018 | Doering ................ F02D 41/123 |
| 2018/0297475 | A1* | 10/2018 | Zhao ...................... B60T 8/172 |
| 2018/0304869 | A1* | 10/2018 | Hernandez ............. B60T 7/042 |
| 2018/0306158 | A1* | 10/2018 | Books ................... F02N 11/108 |
| 2019/0277206 | A1* | 9/2019 | McCarthy, Jr. ......... F02D 17/02 |

OTHER PUBLICATIONS

International Search Report and Written Opinion for PCT Application No. PCT/US2019/049702, dated Nov. 29, 2019.
Jacobs Vehicle Systems, "Cylinder Deactivation System Overview," 27 pages (2016).

* cited by examiner

SYSTEMS AND METHODS FOR PREVENTING DEACTIVATION OF A CYLINDER OF AN INTERNAL COMBUSTION ENGINE SYSTEM

CROSS-REFERENCE TO RELATED PATENT APPLICATIONS

The present application is the U.S. national phase of PCT Application No. PCT/US2019/049702 filed Sep. 5, 2019, which claims priority to and the benefit of U.S. Provisional Application No. 62/742,507 filed Oct. 8, 2018, the entire disclosures of which are incorporated herein by reference.

TECHNICAL FIELD

The present application relates generally to systems and methods for preventing deactivation of a cylinder of an internal combustion engine system.

BACKGROUND

Internal combustion engines include at least one cylinder which receives fuel and air and which combusts the fuel to produce mechanical energy. This mechanical energy is harvested via a piston which translates within the cylinder. Typically, internal combustion engines include a plurality of cylinders, each independently receiving air and fuel and independently producing mechanical energy. Some of these internal combustion engines have the ability to "deactivate" at least one of the cylinders such that the deactivated cylinder does not consume fuel. In this way, these internal combustion engines are able to reduce fuel consumption in some applications.

SUMMARY

In one embodiment, an internal combustion engine system includes an internal combustion engine, a controller, and an increased brake load event communicator. The internal combustion engine includes a first cylinder and a first cylinder deactivation prevention mechanism. The first cylinder is configured to be selectively activated and deactivated. The first cylinder deactivation prevention mechanism is configured to selectively prevent the first cylinder from being deactivated. The controller is communicable with the first cylinder deactivation prevention mechanism. The controller includes an increased brake load event detection module that is configured to selectively control the first cylinder deactivation prevention mechanism to prevent the first cylinder from being deactivated. The increased brake load event communicator is communicable with the controller. The increased brake load event detection module is configured to control the first cylinder deactivation prevention mechanism to prevent the first cylinder from being deactivated based on a communication from the increased brake load event communicator.

In another embodiment, a control system for controlling operation of an engine comprises at least a first cylinder and a first cylinder deactivation prevention mechanism operatively coupled to the first cylinder. The control system comprises a controller configured to be communicably coupled to the first cylinder deactivation prevention mechanism. The controller comprises an increased brake load event detection module configured to selectively control the first cylinder deactivation prevention mechanism to prevent the first cylinder from being deactivated. An increased brake load event communicator is communicable with the controller. The increased brake load event detection module is configured to control the first cylinder deactivation prevention mechanism to prevent the first cylinder from being deactivated based on a communication from the increased brake load event communicator.

In yet another embodiment, a method for controlling an engine comprising at least one cylinder and a corresponding cylinder deactivation mechanism coupled to the at least one cylinder is provided. The method comprises determining whether an increased brake loading event is occurring. In response to determining that the increase brake loading event is occurring, it is determined if the at least one cylinder is being prevented from being deactivated. In response to the at least one cylinder being prevented from being deactivated, the method includes ceasing preventing the at least one cylinder from being deactivated, and controlling the corresponding cylinder deactivation mechanism to prevent the at least one cylinder from being deactivated.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for preventing deactivation of a cylinder of an internal combustion engine system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

An internal combustion engine includes several cylinders which are connected to a crankshaft. Movement of pistons within these cylinders due to combustion therein causes rotation of the crankshaft. Rotation of the crankshaft may be used to drive outputs wheels of a vehicle. The vehicle includes brakes for selectively slowing at least some of the wheels and, consequently, the vehicle. In some applications, the braking force provided by these brakes is not sufficient to desirably stop the vehicle. For example, if the vehicle has to stop suddenly (e.g., due to an obstruction, etc.), or if it is difficult to stop the vehicle due to road grade, brake failure, and/or heavy loading, it may be difficult or impossible to desirably stop the vehicle.

Implementations herein relate to an internal combustion engine system that includes an internal combustion engine having cylinders that are capable of selectively being activated or deactivated and that are prevented from being deactivated when additional braking force is desired in order to facilitate engine braking or compression braking with the cylinders being activated. In this way, the internal combustion engine system described herein can supplement braking forces provided by brakes of a vehicle when the vehicle has to stop suddenly or when it is otherwise difficult to stop the vehicle due to road grade, brake failure, and/or heavy loading. In this way, the internal combustion engine system described herein is more desirable than typical internal combustion engines.

II. Example Internal Combustion Engine with Cylinder Braking System

Figure 1:
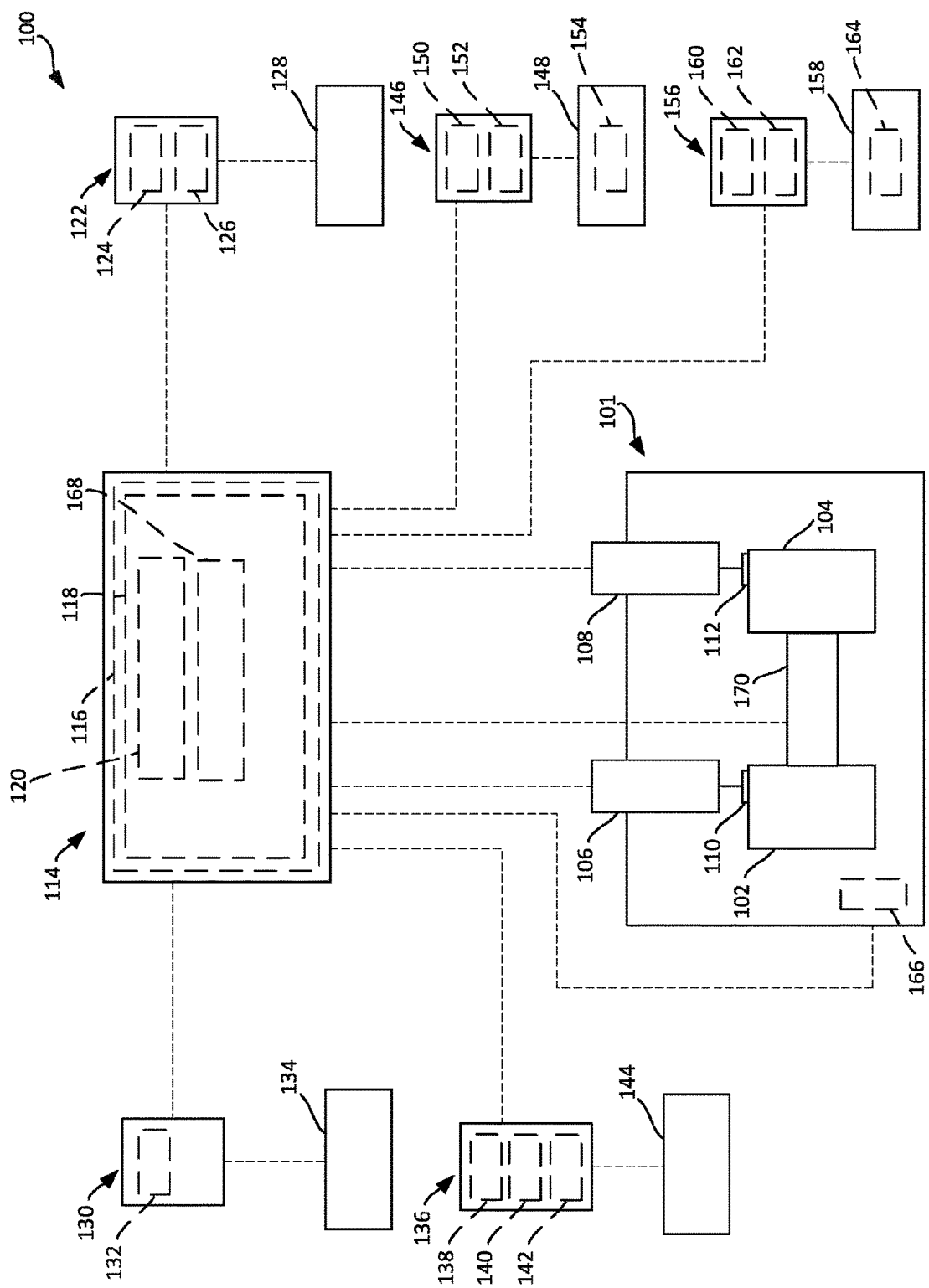
FIG. 1 is a block diagram of an example internal combustion engine system.

FIG. 1 depicts an internal combustion engine system 100 having (e.g., including, comprising, etc.) an internal combustion engine 101. In various embodiments, the internal combustion engine 101 consumes diesel fuel and is a diesel internal combustion engine. In other embodiments, the internal combustion engine 101 consumes gasoline (e.g., petrol, etc.) and is a gasoline internal combustion engine. In still other applications, the internal combustion engine 101 consumes natural gas (e.g., liquid natural gas, compressed natural gas (CNG), etc.), biofuel (e.g., biomass, etc.) ethanol (e.g., E-85, etc.), and other similar fuels. In still other embodiments, the internal combustion engine 101 is a dual-fuel (e.g., bi-fuel, etc.) internal combustion engine and consumes two different fuels (e.g., diesel and gasoline, diesel and ethanol, gasoline and ethanol, natural gas and diesel, etc.).

The internal combustion engine 101 has (e.g., includes, comprises, etc.) a first cylinder 102 and a second cylinder 104. The first cylinder 102 and the second cylinder 104 each independently receive fuel (e.g., from a fuel injector, from a fuel supply, etc.) and air (e.g., from an inlet valve, from an air supply, etc.). The internal combustion engine 101 also has a first piston positioned within the first cylinder 102 and a second piston positioned within the second cylinder 104. The combustion of fuel within the first cylinder 102 causes translation of the first piston and the combustion of fuel within the second cylinder 104 causes translation of the second piston. The internal combustion engine 101 is configured to selectively transform translation of the first piston and/or second piston into mechanical energy which can be harvested (e.g., collected, gathered, obtained, etc.) for use in, for example, rotating a driveshaft (e.g., for driving wheels of a vehicle having the internal combustion engine system 100, etc.).

It is understood that in addition to the first cylinder 102 and the second cylinder 104, the internal combustion engine 101 may include a third cylinder, a fourth cylinder, a fifth cylinder, and additional other cylinders such that the internal combustion engine 101 has a target number of cylinders and is tailored for a target application. For example, the internal combustion engine 101 may include six, eight, ten, twelve, sixteen, twenty, or other numbers of cylinders and an equal number of pistons.

The first cylinder 102 and the second cylinder 104 are each configured to be selectively activated (e.g., engaged, coupled, connected, etc.) and deactivated (e.g., disengaged, decoupled, disconnected, etc.). The static state of the first cylinder 102 and the second cylinder 104 is activated, such that by preventing the first cylinder 102 and/or the second cylinder 104 from being deactivated, the first cylinder 102 and/or the second cylinder 104 is and remains activated until the first cylinder 102 ceases to be prevented from being deactivated and/or the second cylinder 104 ceases to be prevented from being deactivated. When the first cylinder 102 and/or the second cylinder 104 is deactivated, the first cylinder 102 and/or the second cylinder 104 may not consume any fuel. In this way, the internal combustion engine 101 may deactivate the first cylinder 102 and/or the second cylinder 104 to conserve fuel (e.g., when the internal combustion engine 101 is at idle or relatively low load, etc.).

It is understood that in addition to the first cylinder 102 and the second cylinder 104, the internal combustion engine 101 may include at least one cylinder (e.g., a dedicated cylinder, etc.) that is not capable of being selectively deactivated. For example, the internal combustion engine 101 may include the first cylinder 102, the second cylinder 103, and four dedicated cylinders which are not capable of being selectively deactivated.

The internal combustion engine 101 also includes a first cylinder deactivation prevention mechanism 106 associated with the first cylinder 102 and a second cylinder deactivation prevention mechanism 108 associated with the second cylinder 104. The first cylinder 102 includes a first exhaust valve 110 and the second cylinder 104 includes a second exhaust valve 112. The first exhaust valve 110 selectively opens to expel (e.g., vent, etc.) exhaust gases from the first cylinder 102. Similarly, the second exhaust valve 112 selectively opens to expel exhaust gases from the second cylinder 104.

The internal combustion engine 101 is defined by a cycle. The cycle occurs separately within the first cylinder 102 and the second cylinder 104. In various embodiments, the cycle is a 4-stroke cycle which includes an intake stroke, a compression stroke following the intake stroke, a combustion stroke following the compression stroke, and an exhaust stroke preceding a subsequent intake stroke. In some embodiments, the first exhaust valve 110 and the second exhaust valve 112 can be opened at the end of the compression stroke to facilitate engine braking or compression braking which provides braking to the internal combustion engine 101. For example, in one embodiment, the first exhaust valve 110 and the second exhaust valve 112 are capable of being opened at the end of the compression stroke when the first cylinder 102 and the second cylinder 104 are activated, and the first exhaust valve 110 and the second exhaust valve 112 are not capable of being opened at the end of the compression stroke when the first cylinder 102 and the second cylinder 104 are deactivated.

It is understood that while the cycle of the internal combustion engine 101 is described herein as a 4-stroke cycle, the cycle may instead be a 2-stroke, 6-stroke, or other similar cycle.

The first cylinder deactivation prevention mechanism 106 selectively prevents the first cylinder 102 from being deactivated and enables the first exhaust valve 110 to be opened at the end of the compression stroke of the first cylinder 102 when the first cylinder 102 is not deactivated (e.g., when the first cylinder 102 is activated, when the first cylinder 102 is prevented from being deactivated, etc.). For example, the first cylinder deactivation prevention mechanism 106 may interface with the first exhaust valve 110 to selectively prevent the first exhaust valve 110 from being held closed at the end of the compression stroke of the first cylinder 102 (e.g., to facilitate opening of the first exhaust valve 110 when the first cylinder 102 is activated, etc.). When the first cylinder 102 is deactivated, the first cylinder 102 may not be utilized to slow the internal combustion engine 101 (e.g., to reduce a speed of the internal combustion engine 101, to reduce a speed of a vehicle be propelled by the internal combustion engine 101, etc.) via engine braking (e.g., where the internal combustion engine 101 is a gasoline internal combustion engine, etc.) or compression braking (e.g., where the internal combustion engine 101 is a diesel engine, etc.). In this way, the first cylinder deactivation prevention mechanism 106 is configured to selectively facilitate the use of the first cylinder 102 to slow the internal combustion engine 101 via engine braking or compression braking by preventing deactivation of the first cylinder 102 and enabling the first exhaust valve 110 to be opened at the end of the compression stroke of the first cylinder 102 when the first cylinder 102 is activated.

Similarly, the second cylinder deactivation prevention mechanism 108 selectively prevents the second cylinder 104 from being deactivated and enables the second exhaust valve 112 to be opened at the end of the compression stroke of the second cylinder 104 when the second cylinder 104 is not deactivated (e.g., when the second cylinder 104 is activated, when the second cylinder 104 is prevented from being deactivated, etc.). For example, the second cylinder deactivation prevention mechanism 108 may interface with the second exhaust valve 112 to selectively prevent the second exhaust valve 112 from being held closed at the end of the compression stroke of the second cylinder 104 (e.g., to facilitate opening of the second exhaust valve 112 when the second cylinder 104 is activated, etc.). When the second cylinder 104 is deactivated, the second cylinder 104 may not be utilized to slow the internal combustion engine 101 via engine braking or compression braking. In this way, the second cylinder deactivation prevention mechanism 108 is configured to selectively facilitate the use of the second cylinder 104 to slow the internal combustion engine 101 via engine braking or compression braking by preventing deactivation of the second cylinder 104 and enabling the second exhaust valve 112 to be opened at the end of the compression stroke of the second cylinder 104 when the second cylinder 104 is activated.

It is also understood that, in addition to the first cylinder deactivation prevention mechanism 106 and the second cylinder deactivation prevention mechanism 108, the internal combustion engine 101 may include a third cylinder deactivation prevention mechanism (e.g., if the internal combustion engine 101 includes a third cylinder, etc.), a fourth cylinder deactivation prevention mechanism (e.g., if the internal combustion engine 101 includes a fourth cylinder, etc.), a fifth cylinder deactivation prevention mechanism (e.g., if the internal combustion engine 101 includes a fifth cylinder, etc.), and additional other cylinder deactivation prevention mechanisms such that the internal combustion engine 101 has a target number of cylinder deactivation prevention mechanisms and is tailored for a target application. For example, the internal combustion engine 101 may include six, eight, ten, twelve, sixteen, twenty, or other numbers of cylinder deactivation prevention mechanisms. The internal combustion engine 101 may include more cylinders than cylinder deactivation prevention mechanisms (e.g., two cylinders do not include cylinder deactivation prevention mechanisms, etc.).

It is also understood that the internal combustion engine 101 may only include the first cylinder 102 and not the second cylinder 104 (e.g., in embodiments where the internal combustion engine 101 only has a single cylinder that can be selectively deactivated, etc.). In these embodiments, the internal combustion engine 101 would not include the second cylinder deactivation prevention mechanism 108.

It is also understood that, in addition to the first exhaust valve 110 and the second exhaust valve 112, the internal combustion engine 101 may include a third exhaust valve (e.g., if the internal combustion engine 101 includes a third cylinder, etc.), a fourth exhaust valve (e.g., if the internal combustion engine 101 includes a fourth cylinder, etc.), a fifth exhaust valve (e.g., if the internal combustion engine 101 includes a fifth cylinder, etc.), and additional other exhaust valves such that the internal combustion engine 101 has a target number of exhaust valves and is tailored for a target application. For example, the internal combustion engine 101 may include six, eight, ten, twelve, sixteen, twenty, or other numbers of exhaust valves. The internal combustion engine 101 may include the same amount of exhaust valves as cylinders, or each cylinder may include two or more exhaust valves.

In various embodiments, the first cylinder deactivation prevention mechanism 106 is a mechanical assembly (e.g., linkage, rod, cam, etc.) that is configured to selectively prevent the first cylinder 102 from being deactivated. For example, the first cylinder deactivation prevention mechanism 106 may be a mechanical assembly that prevents the first exhaust valve 110 from being held closed at various times during the cycle of the first cylinder 102 (e.g., at the end of the compression stroke of the cycle of the first cylinder 102, etc.) when the first cylinder 102 is activated. For example, the first cylinder deactivation prevention mechanism 106 may be a camshaft locking mechanism that includes a solenoid valve that actuates to lock or unlock a rocker arm of the first exhaust valve 110 of the first cylinder 102 such that the first exhaust valve 110 is prevented from being held closed (e.g., the first exhaust valve 110 is open, the first exhaust valve 110 is capable of being open, etc.) at various times during the cycle of the first cylinder 102 when the first cylinder 102 is activated. In another example, the first cylinder deactivation prevention mechanism 106 may be a pushrod locking mechanism that includes a solenoid valve that actuates to lock or unlock a rocker arm of the first exhaust valve 110 of the first cylinder 102 such that the first exhaust valve 110 is prevented from being held closed (e.g., the first exhaust valve 110 is open, the first exhaust valve 110 is capable of being open, etc.) at various times during the cycle of the first cylinder 102 when the first cylinder 102 is activated.

In some embodiments where the first cylinder 102 is activated, an intake valve of the first cylinder 102 is opened such that air flows into the first cylinder 102, the intake valve is closed, the piston within the first cylinder 102 compresses the air, and the first exhaust valve 110 is prevented from being held closed (e.g., the first exhaust valve 110 is open, the first exhaust valve 110 is capable of being open, etc.) by the first cylinder deactivation prevention mechanism 106 so that the compressed air can be expelled from the first cylinder 102 into an exhaust manifold via the first exhaust valve 110.

In various embodiments, the second cylinder deactivation prevention mechanism 108 is a mechanical assembly (e.g., linkage, rod, cam, etc.) that is configured to selectively prevent the second cylinder 104 from being deactivated. For example, the second cylinder deactivation prevention mechanism 108 may be a mechanical assembly that prevents the second exhaust valve 112 from being held closed (e.g., the second exhaust valve 112 is open, the second exhaust valve 112 is capable of being open, etc.) at various times during the cycle of the second cylinder 104 (e.g., at the end of the compression stroke of the cycle of the second cylinder 104, etc.) when the second cylinder 104 is activated. For example, the second cylinder deactivation prevention mechanism 108 may be a camshaft locking mechanism that includes a solenoid valve that actuates to lock or unlock a rocker arm of the second exhaust valve 112 of the second cylinder 104 such that the second exhaust valve 112 is prevented from being held closed (e.g., the second exhaust valve 112 is open, the second exhaust valve 112 is capable of being open, etc.) at various times during the cycle of the second cylinder 104 when the second cylinder 104 is activated. In another example, the second cylinder deactivation prevention mechanism 108 may be a pushrod locking mechanism that includes a solenoid valve that actuates to lock or unlock a rocker arm of the second exhaust valve 112 of the second cylinder 104 such that the second exhaust valve 112 is prevented from being held closed (e.g., the second exhaust valve 112 is open, the second exhaust valve 112 is capable of being open, etc.) at various times during the cycle of the second cylinder 104 when the second cylinder 104 is activated.

In some embodiments where the second cylinder 104 is activated, an intake valve of the second cylinder 104 is opened such that air flows into the second cylinder 104, the intake valve is closed, the piston within the second cylinder 104 compresses the air, and the second exhaust valve 112 is prevented from being held closed (e.g., the second exhaust valve 112 is open, the second exhaust valve 112 is capable of being open, etc.) by the second cylinder deactivation prevention mechanism 108 so that the compressed air can be expelled from the second cylinder 104 into an exhaust manifold via the second exhaust valve 112.

The internal combustion engine system 100 also includes a controller 114 (e.g., central control, engine control unit (ECU), engine control module (ECM), etc.). The controller 114 includes a processor 116. The processor 116 may include a microprocessor, an application-specific integrated circuit (ASIC), a field-programmable gate array (FPGA), etc., or combinations thereof. The processor 116 also includes a memory 118. The memory 118 may include, but is not limited to, electronic, optical, magnetic, or any other storage or transmission device capable of providing a processor, ASIC, FPGA, etc. with program instructions. The memory 118 may include a memory chip, Electrically Erasable Programmable Read-Only Memory (EEPROM), Erasable Programmable Read Only Memory (EPROM), flash memory, or any other suitable memory from which the processor 116 can read instructions. The instructions may include code from any suitable programming language.

The controller 114 is electrically or communicatively coupled to both the first cylinder deactivation prevention mechanism 106 and the second cylinder deactivation prevention mechanism 108. The controller 114 is configured to communicate with the first cylinder deactivation prevention mechanism 106 to selectively prevent the first cylinder 102 from being deactivated and to communicate with the second cylinder deactivation prevention mechanism 108 to selectively prevent the second cylinder 104 from being deactivated.

In embodiments where the internal combustion engine 101 includes additional cylinder deactivation prevention mechanisms, the controller 114 is similarly electrically or communicatively coupled to the additional cylinder deactivation prevention mechanisms to selectively prevent additional cylinders from being deactivated, as described with respect to the first cylinder deactivation prevention mechanism 106, the second cylinder deactivation prevention mechanism 108, the first cylinder 102, the second cylinder 104, the first exhaust valve 110, and the second exhaust valve 112, herein.

The controller 114 includes an increased brake load event detection module 120. The increased brake load event detection module 120 is configured to receive a communication (e.g., road grade, traffic distance, load, diagnostic parameter, etc.) and to detect the presence of an increased brake load event associated with the internal combustion engine 101 based on that communication. The presence of an increased brake load event indicates that providing additional braking capability to the internal combustion engine system 100 is useful in operating the internal combustion engine system 100. The increased brake load event may occur when the internal combustion engine system 100 determines that additional braking capability may be required to, for example, slow down a vehicle having the internal combustion engine system 100. The increased brake load event detection module 120 is further configured to, in response to detecting the presence of an increased brake load event, communicate with the first cylinder deactivation prevention mechanism 106 and/or the second cylinder deactivation prevention mechanism 108 to selectively prevent the first cylinder 102/or the second cylinder 104 from being deactivated, thereby enabling the first exhaust valve 110 to be open at the end of the compression stroke of the cycle of the first cylinder 102 and/or enabling the second exhaust valve 112 to be open at the end of the compression stroke of the cycle of the second cylinder 104. In this way, the increased brake load event detection module 120 may provide additional braking capability when an increased brake load event is detected by facilitating the use of the first cylinder 102 and/or the second cylinder 104 (and/or potentially other cylinders) in engine braking or compression braking.

The internal combustion engine system 100 also includes an increased brake load event communicator that is configured to detect whether an increased brake load event is occurring. The presence of an increased brake load event indicates that providing additional braking capability to a vehicle having the internal combustion engine system 100 would be useful in slowing or stopping the vehicle. The internal combustion engine system 100 is configured to selectively prevent the first cylinder 102/or the second cylinder 104 from being deactivated, thereby enabling the first exhaust valve 110 to be open at the end of the compression stroke of the cycle of the first cylinder 102 and/or enabling the second exhaust valve 112 to be open at the end of the compression stroke of the cycle of the second cylinder 104, to provide additional braking capability in response to determining that an increased brake load event is occurring. The increased brake load event communicator may comprise one or more of a road grade communicator, a traffic communicator, a load communicator, a service brake communicator, and a regenerative brake communicator, each of which is discussed further below. Additionally, the increased brake load event communicator may comprise a single integrated communicator (e.g., a road grade communicator, a traffic communicator, a load communicator, a service brake communicator, a regenerative brake communicator, etc.) or multiple communicators or modules.

In various embodiments, the increased brake load event communicator comprises a road grade communicator 122. The road grade communicator 122 is electrically or communicatively coupled to the increased brake load event detection module 120. The road grade communicator 122 is configured to provide a road grade (e.g., a tangent of an angle of a road to a horizontal plane, etc.) of a road over which a vehicle having the internal combustion engine system 100 is traversing to the increased brake load event detection module 120. In this way, the increased brake load event detection module 120 can determine, for example, if the vehicle having the internal combustion engine system 100 is traversing a steep downhill slope. For example, the road grade communicator 122 may determine that a road over which the vehicle having the internal combustion engine system 100 is traversing has a road grade of 6%.

In some embodiments, the road grade communicator 122 includes a road grade sensor 124 (e.g., an accelerometer, a gyroscopic sensor, etc.) that independently senses the road grade and provides the road grade to the increased brake load event detection module 120. For example, the road grade sensor 124 may independently determine that the vehicle having the internal combustion engine system 100 is traversing a flat roadway (e.g., with a road grade of approximately 0%, etc.).

In some embodiments, the road grade communicator 122 includes a road grade transceiver 126 that communicates with a road grade database 128 (e.g., eHorizon, etc.). The road grade transceiver 126 may transmit (e.g., send, etc.) information to the road grade database 128 and receive the road grade from the road grade database 128. For example, the road grade transceiver 126 may provide global positioning system (GPS) coordinates of the vehicle having the internal combustion engine system 100 to the road grade database 128 and the road grade database 128 may send the road grade to the road grade transceiver 126 based on the GPS coordinates, the road grade communicator 122 subsequently providing the road grade to the increased brake load event detection module 120. In such embodiments, the road grade communicator 122 functions as a relay between the increased brake load event detection module 120 and the road grade database 128.

After receiving the road grade from the road grade communicator 122, the increased brake load event detection module 120 compares the road grade to a target road grade and determines that an increased brake load event is occurring when the road grade is greater than the target road grade. For example, the road grade received from the road grade communicator 122 may be 6% and the target road grade may be 4%. According to this example, the increased brake load event detection module 120 will, based on the comparison, determine that an increased brake load event is occurring and subsequently prevent the first cylinder 102 and/or the second cylinder 104 (and/or potentially other cylinders) from being deactivated, thereby facilitating the use of the first cylinder 102 and/or the second cylinder 104 (and/or potentially other cylinders) in engine braking or compression braking.

In various embodiments, the increased brake load event communicator comprises a traffic communicator 130. The traffic communicator 130 is electrically or communicatively coupled to the increased brake load event detection module 120. The traffic communicator 130 is configured to provide traffic information for a road over which a vehicle having the internal combustion engine system 100 is traversing to the increased brake load event detection module 120. In this way, the increased brake load event detection module 120 can determine, for example, if the vehicle having the internal combustion engine system 100 is approaching, or is in, stopped traffic (e.g., stop and go traffic, traffic jam, stopped traffic due to an accident, stopped traffic due to road closures, etc.). For example, the traffic communicator 130 may determine that the vehicle having the internal combustion engine system 100 is quickly approaching stopped traffic and that additional braking capability would be useful to ensure that the vehicle having the internal combustion engine system 100 is safely slowed down prior to encountering the stopped traffic.

In some embodiments, the traffic communicator 130 includes an intelligent transportation system (ITS) transceiver 132 that communicates with an ITS device 134 to determine if the vehicle having the internal combustion engine system 100 is approaching, or is in, stopped traffic. The ITS transceiver 132 may transmit GPS coordinates of the vehicle having the internal combustion engine system 100 is approaching, or is in, stopped traffic to the ITS device 134 and the ITS device 134 may transmit traffic information corresponding to the GPS coordinates back to the ITS transceiver 132. The ITS device 134 may be, for example, a database of traffic information corresponding to a network of roads, including the road upon which the vehicle having the internal combustion engine system 100 is traveling. The traffic communicator 130 functions as a relay between the increased brake load event detection module 120 and the ITS device 134.

After receiving the traffic information from the traffic communicator 130, the increased brake load event detection module 120 determines if the vehicle having the internal combustion engine system 100 is approaching, or is in, stopped or slowed traffic (e.g., a stopped vehicle, a disabled vehicle, an emergency vehicle, non-road vehicles, agricultural vehicles, construction vehicles, etc.). If the vehicle having the internal combustion engine system 100 is approaching stopped or slowed traffic, the traffic communicator 130 is configured to determine a traffic distance indicative of how far the vehicle having the internal combustion engine system 100 is from the stopped or slowed traffic. The traffic distance may be a scalar quantity (e.g., 0.25 miles, 0.5 miles, 0.1 miles, 100 feet, 500 feet, 1,000 feet, etc.) or a vector quantity (e.g., 0.25 miles at an angle of 10° from a center line of the vehicle, 0.5 miles at an angle of 15° from a center line of the vehicle, 0.1 miles at an angle of 7° from a center line of the vehicle, 100 feet at an angle of 37° from a center line of the vehicle, 500 feet at an angle of 21° from a center line of the vehicle, 1,000 feet at an angle of 12° from a center line of the vehicle, etc.).

After determining the traffic distance, the traffic communicator 130 compares the traffic distance to a target traffic distance to determine if the traffic distance is less than the target traffic distance, determines that an increased brake load event is occurring in response to the traffic distance being less than the target traffic distance, and subsequently prevent the first cylinder 102 and/or the second cylinder 104 (and/or potentially other cylinders) from being deactivated, thereby facilitating the use of the first cylinder 102 and/or the second cylinder 104 (and/or potentially other cylinders) in engine braking or compression braking. For example, the increased brake load event detection module 120 may receive traffic information from the traffic communicator 130, determine that the vehicle having the internal combustion engine system 100 is 0.75 miles from stopped traffic, determine that 0.75 miles is less than a target traffic distance of 1 mile, determine that an increased brake load event is occurring and subsequently prevent deactivation of the first cylinder 102 and/or the second cylinder 104 (and/or potentially other cylinders) and facilitating the use of the first cylinder 102 and/or the second cylinder 104 (and/or potentially other cylinders) in engine braking or compression braking.

In various embodiments, the increased brake load event communicator comprises a load communicator 136. The load communicator 136 is electrically or communicatively coupled to the increased brake load event detection module 120. The load communicator 136 is configured to determine a load (e.g., weight, center of gravity, etc.) for a vehicle having the internal combustion engine system 100 to the increased brake load event detection module 120. The load may be a weight (e.g., 2,000 pounds, 5,120 points, etc.) of the vehicle having the internal combustion engine system 100. The load may be the difference between the gross weight (e.g., including weight of a payload, etc.) of the vehicle having the internal combustion engine system 100 and the net weight (e.g., without the weight of the payload, etc.) of the vehicle having the internal combustion engine system 100. The load may be a scalar quantity (e.g., 10 pounds, 100 pounds, 500 pounds, 70,000 pounds, etc.) or a vector quantity (e.g., 10 pounds disposed 50 inches from a centerline of the vehicle and 27 inches from a center of mass of the vehicle, 100 pounds disposed 0 inches from a centerline of the vehicle and 10 inches from a center of mass of the vehicle, 500 pounds disposed −15 inches from a centerline of the vehicle and −2 inches from a center of mass of the vehicle, 70,000 pounds disposed 0 inches from a centerline of the vehicle and 0 inches from a center of mass of the vehicle, etc.). In this way, the increased brake load event detection module 120 can determine, for example, if the vehicle having the internal combustion engine system 100 is so heavy or that a load within the vehicle has shifted so much, that additional braking capability would be useful in slowing down or stopping the vehicle.

In some embodiments, the load communicator 136 includes a load sensor 138 (e.g., a load cell, etc.) that senses the load of at least a portion of the vehicle having the internal combustion engine system 100. For example, the vehicle having the internal combustion engine system 100 may have a cargo bay (e.g., vessel for receiving cargo, bed, hopper, fuel tank, etc.) and the load sensor 138 may be positioned to sense the load of the cargo bay both before a payload (e.g., cargo, products, fuel, liquid cargo, etc.) is loaded into the cargo bay and after the payload is loaded into the cargo bay in order to determine if, after the payload has been loaded into the cargo bay, the vehicle having the internal combustion engine system 100 has a load that exceeds a target load associated with a load at which additional braking capability would be useful to ensure that the vehicle having the internal combustion engine system 100 is safely slowed down. The load sensor 138 may also be positioned to sense the load of the cargo bay at a particular location of the vehicle having the internal combustion engine system 100 so as to determine if load is distributed on the vehicle in such a manner that additional braking capability would be useful to ensure that the vehicle having the internal combustion engine system 100 is safely slowed down.

In some embodiments, the load communicator 136 includes a manual load input 140 (e.g., user interface device, keypad, touchscreen, etc.). The manual load input 140 is configured to receive a manual input from a user regarding the load of the vehicle having the internal combustion engine system 100 (e.g., the user inputs the amount of payload loaded into the vehicle, etc.) instead of, or in addition to, the load sensor 138 being utilized. For example, after loading the cargo bay with 1,200 pounds of payload, a user may utilize the manual load input 140 to inform the load communicator 136 that 1,200 of payload have been loaded into the cargo bay and the load communicator 136 may subsequently send this information to the increased brake load event detection module 120 which, through the use of the increased brake load event detection module 120, determines if an increased brake load event is occurring.

In some embodiments, the load communicator 136 includes a first load transceiver 142 that communicates with a second load transceiver 144 (e.g., of a weigh station, of payload loading equipment, etc.). The first load transceiver 142 may receive a load of a payload of the vehicle having the internal combustion engine system 100 or a load of the vehicle from the second load transceiver 144. For example, a payload may be loaded into a cargo bay of the vehicle having the internal combustion engine system 100, the vehicle may drive onto a load platform of a weigh station, the weigh platform may determine a load of the vehicle and utilize the second load transceiver 144 to send the load of the vehicle to the first load transceiver 142, the first load transceiver 142 may subsequently send the load of the vehicle to the controller 114 which, through the use of the increased brake load event detection module 120, determines if an increased brake load event is occurring.

After receiving the load of the vehicle having the internal combustion engine system 100 or the load of the payload of the vehicle from the load communicator 136, the increased brake load event detection module 120 compares the load to a target load and determines that an increased brake load event is occurring when the load is greater than the target load. For example, the load received from the load communicator 136 may be 2,500 pounds and the target road grade may be 2,250 pounds. According to this example, the increased brake load event detection module 120 will, based on the comparison, determine that an increased brake load event is occurring and subsequently prevent the first cylinder 102 and/or the second cylinder 104 (and/or potentially other cylinders) from being deactivated, thereby facilitating the use of the first cylinder 102 and/or the second cylinder 104 (and/or potentially other cylinders) in engine braking or compression braking. Based on the comparison between the load and the target load, the increased brake load event detection module 120 may determine that an increased brake load event is occurring and subsequently prevent the first cylinder 102 and/or the second cylinder 104 (and/or potentially other cylinders) from being deactivated and facilitating the use of the first cylinder 102 and/or the second cylinder 104 (and/or potentially other cylinders) in engine braking or compression braking.

In various embodiments, the increased brake load event communicator comprises a service brake communicator 146. The service brake communicator 146 is electrically or communicatively coupled to the increased brake load event detection module 120. The service brake communicator 146 is configured to provide diagnostic parameter (e.g., indication of operability, indication of failure, fault codes, etc.) of service brakes 148 (e.g., disc brakes, drum brakes, air brakes, pneumatic brakes, etc.) of the vehicle having the internal combustion engine system 100 to the increased brake load event detection module 120. In this way, the increased brake load event detection module 120 can determine, for example, if additional braking capability would be useful in slowing down or stopping the vehicle having the internal combustion engine system 100 because the service brakes 148 are not operable, not operating in an optimal manner (e.g., are operating inefficiently, etc.), or are producing (e.g., providing, triggering, prompting, etc.) fault codes (e.g., diagnostic codes, failure codes, on-board diagnostic (OBD) codes, etc.).

In some embodiments, the service brake communicator 146 includes a service brake fault code sensor 150 that senses the presence of a fault code provided by the service brakes 148. The presence of a fault code associated with the service brakes 148 may indicate that the service brakes 148 are malfunctioning or in need of service or repair. For example, if the service brakes 148 have failed, a fault code may be generated by the service brakes 148 and received by the service brake fault code sensor 150 or may be generated by the service brake fault code sensor 150 itself. For example, the service brake fault code sensor 150 may receive sensed parameters (e.g., voltage, current, pressure, resistance, connectivity, etc.) from the service brakes 148 and compare the sensed parameters to various thresholds to determine if a fault code should be generated by the service brake fault code sensor 150. If a fault code is received by the service brake fault code sensor 150 or generated by the service brake fault code sensor 150, the fault code is transmitted by the service brake fault code sensor 150 to the increased brake load event detection module 120 such that the increased brake load event detection module 120 can determine that an increased braking load event is occurring when a fault code is received by the increased brake load event detection module 120.

In some embodiments, the service brake communicator 146 includes a first service brake transceiver 152 that communicates with a second service brake transceiver 154 disposed proximate to the service brakes 148. The second service brake transceiver 154 may obtain diagnostic parameter of the service brakes 148 and provide the diagnostic parameter to the first service brake transceiver 152. After receiving the diagnostic parameter from the second service brake transceiver 154, the service brake communicator 146 may send the diagnostic parameter to the increased brake load event detection module 120 for comparing against target diagnostic parameter. In this way, the increased brake load event detection module 120 can determine if the service brakes 148 are operable and, if so, if the service brakes 148 are not operating in an optimal manner (e.g., the service brakes 148 operate but require servicing to operate in an optimal fashion, e.g., the service brakes 148 are operable such that diagnostic parameter can only attain values that are 70% of the associated values of target diagnostic parameter, etc.). The increased brake load event detection module 120 may also determine if the service brakes 148 are not operable based upon the diagnostic parameter.

After receiving the diagnostic parameter of the service brakes 148, the increased brake load event detection module 120 compares the diagnostic parameter to a target diagnostic parameter and determines that an increased brake load event is occurring when the diagnostic parameter is less than the target diagnostic parameter or greater than the target diagnostic parameter, depending on the diagnostic parameter. For example, where the diagnostic parameter is a pressure being applied to the service brakes 148 by an air brake system (e.g., for slowing the vehicle having the internal combustion engine system 100, etc.), the increased brake load event detection module 120 may determine that an increased brake load event is occurring when the pressure being applied to the service brakes 148 is less than a target pressure. In another example, where the diagnostic parameter is an amount of time between when the service brakes 148 are instructed to slow the vehicle having the internal combustion engine system 100 and when the vehicle having the internal combustion engine system 100 is slowed down, the increased brake load event detection module 120 may determine that an increased brake load event is occurring when the time is greater than a target time. Based on the comparison between the diagnostic parameter and the target diagnostic parameter, the increased brake load event detection module 120 may determine that an increased brake load event is occurring and subsequently prevent the first cylinder 102 and/or the second cylinder 104 (and/or potentially other cylinders) from being deactivated, thereby facilitating the use of the first cylinder 102 and/or the second cylinder 104 (and/or potentially other cylinders) in engine braking or compression braking.

In various embodiments, the increased brake load event communicator comprises a regenerative brake communicator 156. The regenerative brake communicator 156 is electrically or communicatively coupled to the increased brake load event detection module 120. The regenerative brake communicator 156 is configured to provide diagnostic parameter of regenerative brakes 158 (e.g., electrical generation brakes, etc.) of the vehicle having the internal combustion engine system 100 to the increased brake load event detection module 120. In this way, the increased brake load event detection module 120 can determine, for example, if additional braking capability would be useful in slowing down or stopping the vehicle having the internal combustion engine system 100 because the regenerative brakes 158 are not operable, not operating in an optimal manner, or are producing fault codes.

In some embodiments, the regenerative brake communicator 156 includes a regenerative brake fault code sensor 160 that senses the presence of a fault code provided by the regenerative brakes 158. The presence of a fault code associated with the regenerative brakes 158 may indicate that the regenerative brakes 158 are malfunctioning or in need of service or repair. For example, if the regenerative brakes 158 have failed, a fault code may be generated by the regenerative brakes 158 and received by the regenerative brake fault code sensor 160 or may be generated by the regenerative brake fault code sensor 160 itself. For example, the regenerative brake fault code sensor 160 may receive sensed parameters from the regenerative brakes 158 and compare the sensed parameters to various thresholds to determine if a fault code should be generated by the regenerative brake fault code sensor 160. If a fault code is received by the regenerative brake fault code sensor 160 or generated by the regenerative brake fault code sensor 160, the fault code is transmitted by the regenerative brake fault code sensor 160 to the increased brake load event detection module 120 such that the increased brake load event detection module 120 can determine that an increased braking load event is occurring when a fault code is received by the increased brake load event detection module 120.

In some embodiments, the regenerative brake communicator 156 includes a first regenerative brake transceiver 162 that communicates with a second regenerative brake transceiver 164 disposed proximate to the regenerative brakes 158. The second regenerative brake transceiver 164 may obtain diagnostic parameter of the regenerative brakes 158 and provide the diagnostic parameter to the first regenerative brake transceiver 162. After receiving the diagnostic parameter from the second regenerative brake transceiver 164, the regenerative brake communicator 156 may send the diagnostic parameter to the increased brake load event detection module 120 for comparing against a target diagnostic parameter. In this way, the increased brake load event detection module 120 can determine if the regenerative brakes 158 are operable and, if so, if the regenerative brakes 158 are not operating in an optimal manner (e.g., the regenerative brakes 158 operate but require servicing to operate in an optimal fashion, e.g., the regenerative brakes 158 are operable such that diagnostic parameter can only attain values that are 70% of the associated values of target diagnostic parameter, etc.). The increased brake load event detection module 120 may also determine if the regenerative brakes 158 are not operable based upon the diagnostic parameter.

After receiving the diagnostic parameter of the regenerative brakes 158, the increased brake load event detection module 120 compares the diagnostic parameter to target diagnostic parameter and determines that an increased brake load event is occurring when the diagnostic parameter is less than the target diagnostic parameter or greater than the target diagnostic parameter, depending on the diagnostic parameter. For example, where the diagnostic parameter is a voltage being produced by the regenerative brakes 158 (e.g., by an electrical generator within the regenerative brakes 158, etc.), the increased brake load event detection module 120 may determine that an increased brake load event is occurring when the voltage is less than a target voltage. In another example, where the diagnostic parameter is an amount of time between when the regenerative brakes 158 are instructed to slow the vehicle having the internal combustion engine system 100 and when the vehicle having the internal combustion engine system 100 is slowed down, the increased brake load event detection module 120 may determine that an increased brake load event is occurring when the time is greater than a target time. Based on the comparison between the diagnostic parameter and the target diagnostic parameter, the increased brake load event detection module 120 may determine that an increased brake load event is occurring and subsequently prevent the first cylinder 102 and/or the second cylinder 104 (and/or potentially other cylinders) from being deactivated, thereby facilitating the use of the first cylinder 102 and/or the second cylinder 104 (and/or potentially other cylinders) in engine braking or compression braking.

In the particular implementation shown in FIG. 1, the internal combustion engine system 100 includes each of the road grade communicator 122, the traffic communicator 130, the load communicator 136, the service brake communicator 146, and the regenerative brake communicator 156. In some embodiments, the internal combustion engine system 100 does not include at least one of the road grade communicator 122, the traffic communicator 130, the load communicator 136, the service brake communicator 146, and the regenerative brake communicator 156. In other embodiments, the internal combustion engine system 100 includes multiple of the road grade communicator 122, the traffic communicator 130, the load communicator 136, the service brake communicator 146, and the regenerative brake communicator 156 (e.g., two of the load communicators 136, etc.).

After the first cylinder 102 and/or the second cylinder 104 has been prevented from being deactivated (e.g., in response to communications between the road grade communicator 122 and the increased brake load event detection module 120, in response to communications between the traffic communicator 130 and the increased brake load event detection module 120, in response to communications between the load communicator 136 and the increased brake load event detection module 120, in response to communications between the service brake communicator 146 and the increased brake load event detection module 120, in response to communications between the regenerative brake communicator 156 and the increased brake load event detection module 120, etc.), the increased brake load event detection module 120 is configured to cease preventing the first cylinder 102 and/or the second cylinder 104 from being deactivated in response to (i) communications from at least one increased brake load event communicator (e.g., the road grade communicator 122, the traffic communicator 130, the load communicator 136, the service brake communicator 146, the regenerative brake communicator 156, etc.) or (ii) a speed of the vehicle having the internal combustion engine system 100 being less than a target vehicle speed (e.g., an idle speed, approximately zero miles per hour (MPH), less than 5 MPH, etc.).

The speed of the vehicle is measured by a vehicle speed sensor 166. The vehicle speed sensor 166 may be coupled to, or positioned within, the internal combustion engine 101. The vehicle speed sensor 166 may, for example, be coupled to an output shaft of the internal combustion engine 101 (e.g., to measure a rotational speed of the output shaft, etc.). The controller 114 includes a vehicle speed module 168. The vehicle speed module 168 is electrically or communicatively coupled to the vehicle speed sensor 166 and is configured to receive the vehicle speed from the vehicle speed sensor 166.

The internal combustion engine 101 also includes a braking mechanism 170. The braking mechanism 170 is electrically or communicatively coupled to the increased brake load event detection module 120 and is configured to perform engine braking or compression braking using the first cylinder 102 and/or the second cylinder 104 (and/or potentially other cylinders) in response to a communication from the increased brake load event detection module 120 indicating that an increased brake load event is occurring.

Figure 2:
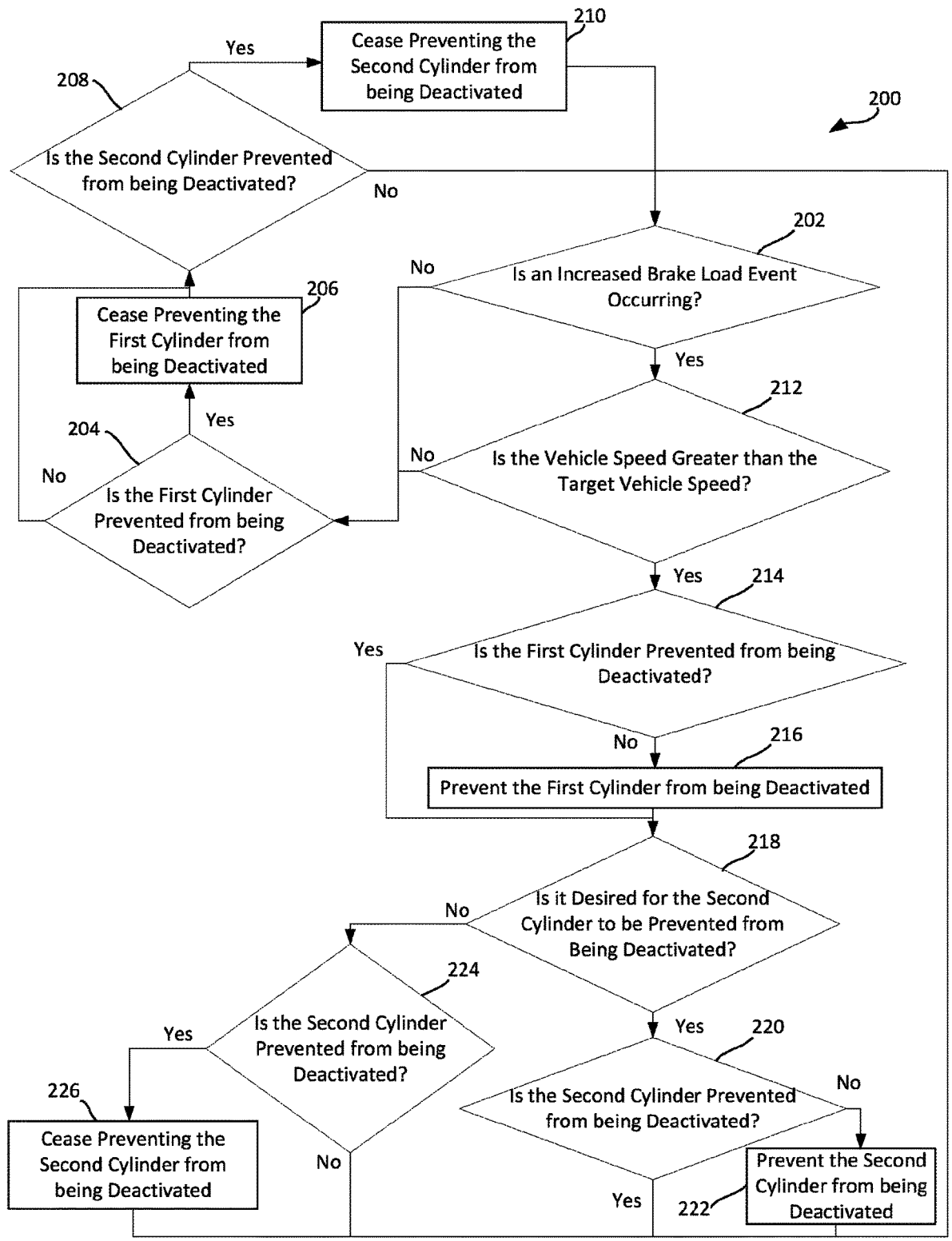
FIG. 2 is a block diagram of an example process for operating the internal combustion engine system shown in FIG. 1.

FIG. 2 depicts a process 200 implemented by the increased brake load event detection module 120 for operating the internal combustion engine system 100 to selectively prevent the first cylinder 102 and/or the second cylinder 104 from being deactivated, thereby facilitating the use of the first cylinder 102 and/or the second cylinder 104 in engine braking or compression braking.

The process 200 begins in block 202 with determining, by the increased brake load event detection module 120, if an increased brake load event is occurring. For example, if the road grade communicator 122 transmits a road grade (e.g., 7%, etc.) to the increased brake load event detection module 120 that is greater than the target road grade (e.g., 5%, etc.) stored by the increased brake load event detection module 120, the increased brake load event detection module 120 determines that an increased brake load event is occurring. In another example, if the traffic communicator 130 transmits a traffic distance (e.g., 0.25 miles, etc.) to the increased brake load event detection module 120 that is less than the target traffic distance (e.g., 0.5 miles, etc.) stored by the increased brake load event detection module 120, the increased brake load event detection module 120 determines that an increased brake load event is occurring. In yet another example, if the load communicator 136 transmits a load (e.g., 3,000 pounds, etc.) to the increased brake load event detection module 120 that is greater than the target load (e.g., 2,750 pounds, etc.) stored by the increased brake load event detection module 120, the increased brake load event detection module 120 determines that an increased brake load event is occurring. In yet another example, if the service brake communicator 146 transmits a diagnostic parameter (e.g., 50 pounds per square inch (PSI), etc.) to the increased brake load event detection module 120 that is less than the target diagnostic parameter (e.g., 100 PSI, etc.) stored by the increased brake load event detection module 120, the increased brake load event detection module 120 determines that an increased brake load event is occurring. In yet another example, if the regenerative brake communicator 156 transmits a diagnostic parameter (e.g., 10 Volts, etc.) to the increased brake load event detection module 120 that is less than the target diagnostic parameter (e.g., 12 Volts, etc.) stored by the increased brake load event detection module 120, the increased brake load event detection module 120 determines that an increased brake load event is occurring.

If an increased brake load event is not occurring, the process 200 continues in block 204 with determining, by the increased brake load event detection module 120, if the first cylinder 102 is prevented from being deactivated (e.g., if the first cylinder 102 is activated, etc.). If the first cylinder 102 is prevented from being deactivated, the process 200 continues in block 206 with ceasing to prevent the first cylinder 102 from being deactivated (e.g., facilitating the deactivation of the first cylinder 102, etc.). For example, the increased brake load event detection module 120 may communicate with the first cylinder deactivation prevention mechanism 106 such that the first exhaust valve 110 is capable of being closed at various times during the cycle of the first cylinder 102 (e.g., at the end of the compression stroke of the cycle of the first cylinder 102, etc.). The process 200 then continues in block 208 with determining, by the increased brake load event detection module 120, if the second cylinder 104 is prevented from being deactivated (e.g., if the second cylinder 104 is activated, etc.). If the second cylinder 104 is prevented from being deactivated, the process 200 continues in block 210 with ceasing to prevent the second cylinder 104 from being deactivated (e.g., facilitating the deactivation of the second cylinder 104, etc.). For example, the increased brake load event detection module 120 may communicate with the second cylinder deactivation prevention mechanism 108 such that the second exhaust valve 112 is capable of being closed at various times during the cycle of the second cylinder 104 (e.g., at the end of the compression stroke of the cycle of the second cylinder 104, etc.). The process 200 then continues with block 202. If in block 204 the first cylinder 102 is not prevented from being deactivated (e.g., if the first cylinder 102 is capable of being deactivated, if the first cylinder 102 is deactivated, etc.), the process 200 continues with block 208 (e.g., skipping block 206, etc.). If in block 208 the second cylinder 104 is not prevented from being deactivated (e.g., if the second cylinder 104 is capable of being deactivated, if the second cylinder 104 is deactivated etc.), the process 200 continues with block 202 (e.g., skipping block 210, etc.).

If in block 202 an increased brake load event is occurring, the process 200 continues in block 212 with determining, by the increased brake load event detection module 120, if the vehicle speed measured by the vehicle speed sensor 166 is greater than the target vehicle speed stored by the increased brake load event detection module 120. If the vehicle speed (e.g., 5 MPH, etc.) is not greater than the target vehicle speed (e.g., 10 MPH, etc.), the process 200 continues with block 204.

If the vehicle speed (e.g., 50 MPH, etc.) is greater than or equal to the target vehicle speed (e.g., 10 MPH, etc.), the process continues in block 214 with determining, by the increased brake load event detection module 120, if the first cylinder 102 is prevented from being deactivated (e.g., if the first cylinder 102 is activated, etc.). If the first cylinder 102 is not prevented from being deactivated (e.g., if the first cylinder 102 is capable of being deactivated, if the first cylinder 102 is deactivated, etc.), the process 200 continues in block 216 with preventing the first cylinder 102 from being deactivated (e.g., activating the first cylinder 102, etc.). For example, the increased brake load event detection module 120 may communicate with the first cylinder deactivation prevention mechanism 106 such that the first exhaust valve 110 is capable of being open at various times during the cycle of the first cylinder 102 (e.g., at the end of the compression stroke of the cycle of the first cylinder 102, etc.).

The process 200 then continues in block 218 with determining, by the increased brake load event detection module 120, if it is desired for the second cylinder 104 to be prevented from being deactivated (e.g., for the second cylinder 104 to be activated, etc.). For example, the increased brake load event detection module 120 may determine that a road grade difference (e.g., 2%, etc.) between a road grade (e.g., 7%, etc.) and target road grade (e.g., 5%, etc.) is above a road grade threshold (e.g., 1%, etc.) at which it is desired to utilize both the first cylinder 102 and the second cylinder 104 in engine braking or compression braking, and therefore determine that it is desired to prevent both the first cylinder 102 and the second cylinder 104 from being deactivated (e.g., for both the first cylinder 102 and the second cylinder 104 to be activated, etc.).

In another example, the increased brake load event detection module 120 may determine that a traffic distance difference (e.g., 0.25 miles, etc.) between a traffic distance (e.g., 0.5 miles, etc.) and a target traffic distance (e.g., 0.25 miles, etc.) is below a traffic distance threshold (e.g., 0.3 miles, etc.) at which it is desired to utilize both the first cylinder 102 and the second cylinder 104 in engine braking or compression braking, and therefore determine that it is desired to prevent both the first cylinder 102 and the second cylinder 104 from being deactivated (e.g., for both the first cylinder 102 and the second cylinder 104 to be activated, etc.). In yet another example, the increased brake load event detection module 120 may determine that a load difference (e.g., 250 pounds, etc.) between a load (e.g., 3,000 pounds, etc.) and a target load (e.g., 2,750 pounds, etc.) is above a load threshold (e.g., 100 pounds, etc.) at which it is desired to utilize both the first cylinder 102 and the second cylinder 104 in engine braking or compression braking, and therefore determine that it is desired prevent both the first cylinder 102 and the second cylinder 104 from being deactivated (e.g., for both the first cylinder 102 and the second cylinder 104 to be activated, etc.).

In yet another example, the increased brake load event detection module 120 may determine that a diagnostic parameter difference (e.g., 50 PSI, etc.) between a diagnostic parameter (e.g., 50 PSI, etc.) and a target diagnostic parameter (e.g., 100 PSI, etc.) is above a diagnostic parameter threshold (e.g., 20 PSI, etc.) at which it is desired to utilize both the first cylinder 102 and the second cylinder 104 in engine braking or compression braking, and therefore determine that it is desired to prevent both the first cylinder 102 and the second cylinder 104 from being deactivated (e.g., for both the first cylinder 102 and the second cylinder 104 to be activated, etc.). In yet another example, the increased brake load event detection module 120 may determine that a diagnostic parameter difference (e.g., 2 Volts, etc.) between a diagnostic parameter (e.g., 10 Volts, etc.) and a target diagnostic parameter (e.g., 12 Volts, etc.) is above a diagnostic parameter threshold (e.g., 1 Volt, etc.) at which it is desired to utilize both the first cylinder 102 and the second cylinder 104 in engine braking or compression braking, and therefore determine that it is desired to prevent both the first cylinder 102 and the second cylinder 104 from being deactivated (e.g., for both the first cylinder 102 and the second cylinder 104 to be activated, etc.).

If it is desired to prevent the second cylinder 104 from being deactivated (e.g., for the second cylinder 104 to be activated, etc.), the process 200 continues in block 220 with determining, by the increased brake load event detection module 120, if the second cylinder 104 is prevented from being deactivated (e.g., if the second cylinder 104 is activated, etc.). If the second cylinder 104 is not prevented from being deactivated (e.g., if the second cylinder 104 is capable of being deactivated, if the second cylinder 104 is deactivated, etc.) the process continues in block 222 with preventing the second cylinder 104 from being deactivated. For example, the increased brake load event detection module 120 may communicate with the second cylinder deactivation prevention mechanism 108 such that the second exhaust valve 112 is capable of being opened at various times during the cycle of the first cylinder 102 (e.g., at the end of the compression stroke of the cycle of the first cylinder 102, etc.). The process 200 then continues with block 202.

If in block 214 the first cylinder 102 is prevented from being deactivated (e.g., the first cylinder 102 is activated, etc.), then the process 200 continues with block 218 (e.g., skipping block 216, etc.). If in block 218 it is not desired for the second cylinder 104 to be prevented from being deactivated (e.g., for the second cylinder 104 to be activated, etc.), the process 200 continues in block 224 with determining, by the increased brake load event detection module 120, if the second cylinder 104 is prevented from being deactivated (e.g., if the second cylinder 104 is activated, etc.). If the second cylinder 104 is not prevented from being deactivated (e.g., if the second cylinder 104 is capable of being deactivated, if the second cylinder 104 is deactivated, etc.) the process 200 continues with block 202. If the second cylinder 104 is prevented from being deactivated (e.g., if the second cylinder 104 is activated, etc.), the process 200 continues with, in block 226, ceasing to prevent the second cylinder 104 from being deactivated (e.g., facilitating the deactivation of the second cylinder 104, etc.). For example, the increased brake load event detection module 120 may communicate with the second cylinder deactivation prevention mechanism 108 such that the second exhaust valve 112 is capable of being closed at various times during the cycle of the second cylinder 104 (e.g., at the end of the compression stroke of the cycle of the second cylinder 104, etc.). The process 200 then continues with block 202.

In embodiments where the internal combustion engine 101 includes additional cylinder deactivation prevention mechanisms (e.g., where the internal combustion engine 101 includes additional cylinders and additional exhaust valves, etc.), the process 200 is similarly implemented for each of the additional cylinder deactivation prevention mechanisms (e.g., by including additional blocks similar to block 218, block 224, block 226, block 220, and block 222, by including additional blocks similar to block 208 and block 210, etc.).

If the first exhaust valve 110 and/or the second exhaust valve 112 is open, the controller 114 may utilize the braking mechanism 170 to perform engine braking or compression braking, thereby slowing the internal combustion engine 101.

In various embodiments, targets (e.g., target road grades, target traffic distances, target loads, target diagnostic parameters, target vehicle speeds, etc.) are functions of the vehicle speed as determined by the vehicle speed sensor 166. For example, the target traffic distance may be smaller for a vehicle speed of 30 MPH than for a vehicle speed of 50 MPH.

In various embodiments, the increased brake load event detection module 120 ensures that the difference between the target (e.g., target road grade, target traffic distance, target load, target diagnostic parameter, target vehicle speed, etc.) and the communication exist for a target period of time (e.g., 0.5 seconds, 10 seconds, 1 minute, etc.).

The internal combustion engine system 100 may be utilized in non-vehicular applications such as generators, drives (e.g., for driving a driveshaft of mining equipment, for driving a driveshaft of construction equipment, for driving a propeller, etc.), and other similar applications.

III. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "approximately," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. An internal combustion engine system, comprising:
   an internal combustion engine comprising:
   a first cylinder configured to be selectively activated and deactivated; and
   a first cylinder deactivation prevention mechanism, wherein the first cylinder deactivation prevention mechanism is a mechanical assembly, configured to selectively prevent the first cylinder from being deactivated;
   a controller communicable with the first cylinder deactivation prevention mechanism, the controller comprising an increased brake load event detection module configured to selectively control the first cylinder deactivation prevention mechanism to prevent the first cylinder from being deactivated; and
   an increased brake load event communicator, communicable with the controller, comprising a load communicator configured to determine a load distribution from a load, the load communicator comprising a first load transceiver configured to receive the load from a second load transceiver;
   wherein the increased brake load event detection module identifies a target load and is configured to compare the load to the target load; and
   wherein the increased brake load event detection module is configured to control the first cylinder deactivation prevention mechanism to prevent the first cylinder from being deactivated based on a communication, from the increased brake load event communicator, indicating that additional braking capability is needed for the load distribution in response to determining that the load is greater than the target load.

2. The internal combustion engine system of claim 1, wherein:
   the internal combustion engine further comprises a vehicle speed sensor configured to measure a speed of a vehicle within which the internal combustion engine is installed; and
   the increased brake load event detection module is configured to control the first cylinder deactivation prevention mechanism to prevent the first cylinder from being deactivated based on the vehicle speed.

3. The internal combustion engine system of claim 1, wherein:
   the increased brake load event communicator is a road grade communicator, the road grade communicator configured to determine a road grade;
   the communication is the road grade;
   the increased brake load event detection module comprises a target road grade and is configured to compare the road grade to the target road grade; and
   the increased brake load event detection module is configured to control the first cylinder deactivation prevention mechanism to prevent the first cylinder from being deactivated in response to determining that the road grade is greater than the target road grade.

4. The internal combustion engine system of claim 1, wherein:
   the increased brake load event communicator is a traffic communicator configured to determine a traffic distance;
   the communication is the traffic distance;
   the increased brake load event detection module comprises a target traffic distance and is configured to compare the traffic distance to the target traffic distance; and
   the increased brake load event detection module is configured to control the first cylinder deactivation prevention mechanism to prevent the first cylinder from being deactivated in response to determining that the traffic distance is less than the target traffic distance.

5. The internal combustion engine system of claim 1, wherein:
   the increased brake load event communicator is a service brake communicator configured to determine a diagnostic parameter;
   the communication is the diagnostic parameter;
   the increased brake load event detection module comprises a target diagnostic parameter and is configured to compare the diagnostic parameter to the target diagnostic parameter; and
   the increased brake load event detection module is configured to control the first cylinder deactivation prevention mechanism to prevent the first cylinder from being deactivated in response to determining a difference between the diagnostic parameter and the target diagnostic parameter.

6. The internal combustion engine system of claim 1, wherein:
   the increased brake load event communicator is a regenerative brake communicator configured to determine a diagnostic parameter;
   the communication is the diagnostic parameter;
   the increased brake load event detection module comprises a target diagnostic parameter and is configured to compare the diagnostic parameter to the target diagnostic parameter; and
   the increased brake load event detection module is configured to control the first cylinder deactivation prevention mechanism to prevent the first cylinder from being deactivated in response to determining a difference between the diagnostic parameter and the target diagnostic parameter.

7. The internal combustion engine system of claim 1, wherein the internal combustion engine further comprises:
   a second cylinder configured to be selectively activated and deactivated; and
   a second cylinder deactivation prevention mechanism configured to selectively prevent the second cylinder from being deactivated,
   wherein the controller is communicable with the second cylinder deactivation prevention mechanism, and the increased brake load event detection module is also configured to selectively control the second cylinder deactivation prevention mechanism to prevent the second cylinder from being deactivated, and
   wherein the increased brake load event detection module is configured to control the second cylinder deactivation prevention mechanism to prevent the second cylinder from being deactivated based on a communication from the increased brake load event communicator.

8. The internal combustion engine system of claim 7, wherein the internal combustion engine comprises a plurality of cylinders, and wherein at least one cylinder of the plurality of cylinders does not comprise a cylinder deactivation prevention mechanism.

9. A control system for controlling operation of an internal combustion engine comprising at least a first cylinder and a first cylinder deactivation prevention mechanism, wherein the first cylinder deactivation prevention mechanism is a mechanical assembly operatively coupled to the first cylinder, the control system comprising:
  a controller configured to be communicably coupled to the first cylinder deactivation prevention mechanism, the controller comprising an increased brake load event detection module configured to selectively control the first cylinder deactivation prevention mechanism to prevent the first cylinder from being deactivated; and
  an increased brake load event communicator, communicable with the controller, comprising a load communicator configured to determine a load distribution from a load, the load communicator comprising a first load transceiver configured to receive the load from a second load transceiver;
  wherein the increased brake load event detection module identifies a target load and is configured to compare the load to the target load; and
  wherein the increased brake load event detection module is configured to control the first cylinder deactivation prevention mechanism to prevent the first cylinder from being deactivated based on a communication, from the increased brake load event communicator, indicating that additional braking capability is needed for the load distribution in response to determining that the load is greater than the target load.

10. The control system of claim 9, wherein the increased brake load event detection module is configured to control the first cylinder deactivation prevention mechanism to prevent the first cylinder from being deactivated based on a speed of a vehicle within which the internal combustion engine is installed, the speed of the vehicle measured by a vehicle speed sensor.

11. The control system of claim 9, wherein the increased brake load event communicator is configured to determine a road grade such that the communication is the road grade,
  wherein the increased brake load event detection module is configured to compare the road grade to a target road grade, and
  wherein the increased brake load event detection module is configured to control the first cylinder deactivation prevention mechanism to prevent the first cylinder from being deactivated in response to determining that the road grade is greater than the target road grade.

12. The control system of claim 9, wherein the increased brake load event communicator is configured to determine a traffic distance such that the communication is the traffic distance,
  wherein the increased brake load event detection module is configured to compare the traffic distance to the target traffic distance, and
  wherein the increased brake load event detection module is configured to control the first cylinder deactivation prevention mechanism to prevent the first cylinder from being deactivated in response to determining that the traffic distance is less than the target traffic distance.

13. The control system of claim 9, wherein the increased brake load event communicator is configured to determine a diagnostic parameter such that the communication is the diagnostic parameter,
  wherein the increased brake load event detection module is configured to compare the diagnostic parameter to a target diagnostic parameter; and
  wherein the increased brake load event detection module is configured to control the first cylinder deactivation prevention mechanism to prevent the first cylinder from being deactivated in response to determining a difference between the diagnostic parameter and the target diagnostic parameter.

14. The control system of claim 9, wherein the internal combustion engine further comprises a second cylinder configured to be selectively activated and deactivated, and a second cylinder deactivation prevention mechanism configured to selectively prevent the second cylinder from being deactivated,
  wherein the controller is configured to be communicably coupled with the second cylinder deactivation prevention mechanism, and wherein increased brake load event detection module is also configured to selectively control the second cylinder deactivation prevention mechanism to prevent the second cylinder from being deactivated, and
  wherein the increased brake load event detection module is further configured to control the second cylinder deactivation prevention mechanism to prevent the second cylinder from being deactivated based on a communication from the increased brake load event communicator.

15. A method for controlling an engine comprising at least one cylinder and a corresponding cylinder deactivation prevention mechanism coupled to the at least one cylinder, the method comprising:
  receiving by a first load transceiver a load from a second load transceiver;
  identifying a target load;
  comparing the load to the target load;
  determining that the load is greater than the target load;
  determining whether an increased brake loading event is occurring based on a load communicator indicating that additional braking capability is needed for a load distribution determined from the load;
  in response to determining that the increased brake loading event is occurring, determining if the at least one cylinder is being prevented from being deactivated;
  in response to the at least one cylinder being prevented from being deactivated, ceasing preventing the at least one cylinder from being deactivated; and
  controlling the corresponding cylinder deactivation prevention mechanism to prevent the at least one cylinder from being deactivated, wherein the cylinder deactivation prevention mechanism is a mechanical assembly.

16. The method of claim 15, wherein the controlling the first cylinder deactivation prevention mechanism to prevent the at least one cylinder from being deactivated is based on a vehicle speed of a vehicle that includes the engine.

17. The method of claim 15, further comprising:
  determining a road grade of a road on which a vehicle including the engine is traveling; and
  comparing the determined road grade to a target road grade,
  wherein controlling the corresponding cylinder deactivation prevention mechanism to prevent the at least one cylinder from being deactivated is performed responsive to the determined road grade being greater than the target road grade.

18. The method of claim 15, further comprising:
  determining a traffic distance; and comparing the traffic distance to a target traffic distance,
wherein controlling the corresponding cylinder deactivation prevention mechanism to prevent the at least one cylinder from being deactivated is performed responsive to the determined traffic distance being less than the target traffic distance.

19. The internal combustion engine system of claim 1, wherein the first cylinder deactivation prevention mechanism comprises a camshaft locking mechanism, the camshaft locking mechanism including a solenoid valve that actuates to lock or unlock a rocker arm of a first exhaust valve of the first cylinder.

20. The internal combustion engine system of claim 1, wherein the first cylinder deactivation prevention mechanism comprises a pushrod locking mechanism, the pushrod locking mechanism including a solenoid valve that actuates to lock or unlock a rocker arm of a first exhaust valve of the first cylinder.

* * * * *